US012670352B2

(12) United States Patent
Daiki

(10) Patent No.: US 12,670,352 B2
(45) Date of Patent: Jun. 30, 2026

(54) SENSOR SYSTEMS AND METHODS

(71) Applicant: Pragmatic Semiconductor Limited,
Cambridge (GB)

(72) Inventor: Mossaab Daiki, Cambridge (GB)

(73) Assignee: Pragmatic Semiconductor Limited,
Cambridge (GB)

( * ) Notice: Subject to any disclaimer, the term of this
patent is extended or adjusted under 35
U.S.C. 154(b) by 22 days.

(21) Appl. No.: 18/838,275

(22) PCT Filed: Feb. 14, 2023

(86) PCT No.: PCT/GB2023/050332
§ 371 (c)(1),
(2) Date: Aug. 14, 2024

(87) PCT Pub. No.: WO2023/152522
PCT Pub. Date: Aug. 17, 2023

(65) Prior Publication Data
US 2025/0217616 A1    Jul. 3, 2025

(30) Foreign Application Priority Data

Feb. 14, 2022    (GB) ..................................... 2201937

(51) Int. Cl.
*G06K 19/07*        (2006.01)
*G06K 7/10*         (2006.01)
(52) U.S. Cl.
CPC ...... *G06K 19/0716* (2013.01); *G06K 7/10118*
(2013.01); *G06K 19/0709* (2013.01)
(58) Field of Classification Search
CPC ........... G06K 19/0716; G06K 7/10118; G06K
19/0709; H04Q 2209/47
See application file for complete search history.

(56) References Cited

U.S. PATENT DOCUMENTS 8,754,772 B2 *   6/2014   Horng ..................... A61B 5/113
                                              340/539.1
8,988,199 B1     3/2015   Moretti et al.
(Continued)

FOREIGN PATENT DOCUMENTS

EP          2993626        3/2016
WO      WO 00/32095        6/2000
(Continued)

OTHER PUBLICATIONS

International Search Report and the Written Opinion Dated May 15,
2023 From the International Searching Authority Re. Application
No. PCT/GB2023/050332. (12 Pages).
(Continued)

*Primary Examiner* — Curtis J King

(57)    ABSTRACT

A sensor system configured to provide an indication of a
sensed parameter, the sensor system comprising: a reader
comprising a reader antenna configured to transmit a carrier
signal; a tag comprising: a tag antenna configured to receive
the carrier signal; power harvesting circuitry coupled to the
tag antenna and configured to produce an operating voltage
from the receiver carrier signal; the voltage-controlled oscil-
lator, VCO, circuitry coupled to the power harvesting cir-
cuitry and configured to receive the operating voltage there-
from, wherein the VCO circuitry comprises a VCO
configured to generate an output signal having a frequency
which varies based on the sensed parameter, and wherein the
VCO circuitry is configured to modulate an impedance of
the tag antenna according to a timing parameter selected
based on the frequency of the output signal from the VCO;
a controller coupled to the reader antenna and configured to:
(i) identify an indication of the timing parameter of the
impedance modulation of the tag antenna based on detected
changes in the reader antenna impedance, and (ii) determine
(Continued)

10

20

22

30

100

102

110

120 an indication of the sensed parameter based on the identified indication of the timing parameter.

15 Claims, 3 Drawing Sheets

(56) References Cited

U.S. PATENT DOCUMENTS

| | | | | |
|---|---|---|---|---|
| 10,348,282 | B1 * | 7/2019 | Lesso .................... | H03M 1/508 |
| 2002/0167397 | A1 * | 11/2002 | Eroglu ................. | G06K 7/0008 |
| | | | | 340/10.6 |
| 2005/0240369 | A1 * | 10/2005 | Diorio .................. | G01R 35/005 |
| | | | | 340/10.2 |
| 2006/0273882 | A1 * | 12/2006 | Posamentier ...... | G06K 19/0723 |
| | | | | 340/10.3 |
| 2008/0129396 | A1 * | 6/2008 | Kato ........................ | H03L 7/18 |
| | | | | 331/1 A |
| 2008/0136646 | A1 | 6/2008 | Friedrich | |
| 2008/0217409 | A1 * | 9/2008 | Ito ........................ | G06K 7/0004 |
| | | | | 235/440 |
| 2008/0252421 | A1 * | 10/2008 | Khannur .............. | G06K 7/0008 |
| | | | | 340/10.1 |
| 2009/0160613 | A1 * | 6/2009 | Hirota .................... | G06K 17/00 |
| | | | | 400/611 |
| 2009/0174528 | A1 * | 7/2009 | Toda .................... | G06K 7/0004 |
| | | | | 340/10.1 |
| 2011/0193687 | A1 * | 8/2011 | Hirata .................. | G06K 7/0008 |
| | | | | 340/10.4 |
| 2015/0254544 | A1 * | 9/2015 | Kunc ................. | G06K 19/0726 |
| | | | | 235/492 |
| 2017/0063405 | A1 * | 3/2017 | Mizokami ................ | H04B 1/04 |
| 2018/0123639 | A1 * | 5/2018 | Muthali ............. | H04B 1/71635 |
| 2019/0319722 | A1 * | 10/2019 | Yu ........................ | H04L 27/0014 |
| 2021/0126339 | A1 * | 4/2021 | Smith ....................... | H01Q 1/38 |
| 2021/0190935 | A1 * | 6/2021 | Yu ........................... | G01S 13/84 |
| 2023/0136683 | A1 * | 5/2023 | Lee ...................... | H04W 40/32 |
| | | | | 370/254 |
| 2023/0189197 | A1 * | 6/2023 | Srinivasan ............. | H04L 7/041 |
| | | | | 455/456.1 |
| 2024/0230877 | A1 * | 7/2024 | Robertson ................ | G01S 7/35 |

FOREIGN PATENT DOCUMENTS

| | | |
|---|---|---|
| WO | WO 2013/169356 | 11/2013 |
| WO | WO 2015/101695 | 7/2015 |

OTHER PUBLICATIONS

Patents Act 1977: Combined Search and Examination Report Under Sections 17 and 18(3) Dated Aug. 5, 2022 From the Intellectual Property Office of the United Kingdom of Great Britain Re. Application No. GB2201937.6. (6 Pages).

* cited by examiner

SENSOR SYSTEMS AND METHODS

RELATED APPLICATIONS

This application is a National Phase of PCT Patent Application No. PCT/GB2023/050332 having International filing date of Feb. 14, 2023, which claims the benefit of priority of Great Britain Patent Application No. 2201937.6 filed on Feb. 14, 2022. The contents of the above applications are all incorporated by reference as if fully set forth herein in their entirety.

FIELD AND BACKGROUND OF THE INVENTION

Radio-frequency identification ('RFID') technology uses electromagnetic fields to communicate information between readers (or receivers) and tags. For RFID, a reader typically generates an electromagnetic field to interrogate the tag. The tag may respond by communicating relevant information back to the reader. This communication may involve transmission of identifier data for identifying the tag/reader. This communication may also involve transmission of additional data and/or following pre-set communication protocols for radio-frequency communication. As an example, a Near Field Communication ('NFC') protocol may be followed for transmitting data between a reader and tag. Such protocols may enable large amounts of data to be transmitted, and they may also include one or more security elements for establishing authenticated communication prior to transmission of data between reader and tag. For example, a reader and tag may initiate communication with an authentication exchange, and they may only communicate any new data to each other once they have established that the communication is secure.

While such radio-frequency communication methods may be beneficial in enabling data to be communicated, they also place stringent requirements on componentry required for reader/tag. These components will typically require complex semiconductor technology to provide the relevant processing functionality for both the reader and the tag. In turn, this can place requirements on the size and cost of such components, as they may need to house a very large number of functioning transistors, as well as relevant connections therebetween. This may also place stringent requirements on the nature of the silicon substrate used for providing the semiconductors.

The present inventors have identified that it may be advantageous to provide simpler, smaller and/or cheaper componentry which is capable of communicating relevant information without requiring excessive complexity. In particular, the present inventors have identified that certain types of sensor technology could be improved by using simpler mechanisms for transmitting information about sensed parameters between reader and tag. In other words, the present inventors have identified simpler devices that may provide functionality which would otherwise require much greater levels of device complexity, size and/or cost. The simpler mechanisms of the present disclosure may enable low-cost semiconductor technologies to provide high value functionality, running counter to the prevailing approaches in established semiconductor technologies whereby functionality is enabled by complexity.

SUMMARY OF THE INVENTION

Aspects of the disclosure are set out in the independent claims and optional features are set out in the dependent claims. Aspects of the disclosure may be provided in conjunction with each other, and features of one aspect may be applied to other aspects.

In an aspect, there is provided a sensor system configured to provide an indication of a sensed parameter. The sensor system comprises: a reader comprising a reader antenna configured to transmit a carrier signal; and a tag. The tag comprises: a tag antenna configured to receive the carrier signal; power harvesting circuitry coupled to the tag antenna and configured to produce an operating voltage from the received carrier signal; and voltage-controlled oscillator, VCO, circuitry coupled to the power harvesting circuitry and configured to receive the operating voltage therefrom, wherein the VCO circuitry comprises a VCO configured to generate an output signal having a frequency which varies based on the sensed parameter, and wherein the VCO circuitry is configured to modulate an impedance of the tag antenna according to a timing parameter selected based on the frequency of the output signal from the VCO. The sensor system also comprises a controller coupled to the reader antenna and configured to: (i) identify an indication of the timing parameter of the impedance modulation of the tag antenna based on detected changes in the reader antenna impedance, and (ii) determine an indication of the sensed parameter based on the identified indication of the timing parameter.

The VCO circuitry may be coupled to the power harvesting circuitry to receive the operating voltage and configured to modulate an impedance of the tag antenna, wherein the VCO circuitry is configured to control a property of the impedance modulation of the tag antenna based on the sensed parameter. The controller may be coupled to the reader antenna to detect changes in the tag antenna impedance and configured to: (i) identify an indication of the property of the impedance modulation of the tag antenna based on detected changes in the tag antenna impedance from the reader antenna, and (ii) determine an indication of the sensed parameter based on the identified indication of the property of the impedance modulation of the tag antenna.

The VCO circuitry may be configured to vary a timing parameter/pattern for the impedance modulation of the tag antenna based on the sensed parameter. The controller may be configured to identify an indication of the timing parameter of the impedance modulation of the tag antenna based on the presence of a corresponding indication of a timing parameter in the detected changes in tag antenna impedance. The VCO circuitry may be configured to apply one or more pulses to provide the impedance modulation. The timing parameter may comprise a timing parameter for applying pulses. The timing parameter for applying pulses may comprise a pulse duration timing and/or a separation time between adjacent pulses.

In other words, the VCO circuitry may be configured to modulate the impedance of the tag antenna to provide an observable form of temporal behaviour in the tag antenna impedance. This observable form of temporal behaviour may also be detectable in the reader antenna impedance. For example, the form of temporal behaviour may comprise a frequency for variations in impedance (e.g. a number of variations in impedance per unit time) and/or it may comprise a time interval for variations in impedance (e.g. an amount of time which separates successive variations in impedance). The VCO circuitry may be configured to modulate the tag antenna impedance according to a timing pattern by controlling the frequency of tag antenna impedance variations and/or by controlling the time interval between successive tag antenna impedance variations. The controller may be configured to identify the indication of the timing parameter by identifying a frequency of reader antenna impedance variations and/or by identifying a time interval between reader antenna impedance variations. In other words, the controller may be configured to identify an indication of the form of temporal behaviour being applied to the tag antenna impedance by the VCO circuitry of the tag.

The VCO circuitry may be configured to control the impedance modulation of the tag antenna based at least in part on a magnitude of the operating voltage. The VCO may be configured to control the timing parameter (e.g. a pulse duration or separation time, and/or a frequency associated with the impedance modulation of the tag antenna) based at least in part on the magnitude of the operating voltage. For example, the VCO of the VCO circuitry may be arranged to receive a voltage based on the operating voltage (e.g. the operating voltage itself), and to provide an output signal having a frequency which varies based on a magnitude of the operating voltage. The VCO circuitry may be configured to control the impedance modulation of the tag antenna to include both: (i) a sensor modulation component, and (ii) a calibration modulation component. Controlling the impedance modulation of the tag antenna may comprise at least one of: combining the sensor modulation component and the calibration modulation component to provide a combined modulation component, and controlling the impedance modulation of the tag antenna based on the combined modulation component; and controlling the impedance modulation of the tag antenna based on one of the sensor modulation component and the calibration modulation component and then controlling the impedance modulation of the tag antenna based on the other of the sensor modulation component and the calibration modulation component. The controller may be configured to: obtain an indication of at least one of: (i) the combined modulation component, and (ii) both the sensor modulation component and the calibration modulation component, based on detected changes in the tag antenna impedance from the reader antenna; and based on said obtained indication, determine the indication of the sensed parameter.

For example, a sensor VCO of the VCO circuitry may be arranged to generate a sensor output signal having a frequency associated with the sensor measurement. The VCO circuitry may be configured to modulate an impedance of the tag antenna according to a timing parameter selected based on the frequency of the sensor output signal from the sensor VCO. For example, a calibration VCO of the VCO circuitry may be arranged to generate a calibration output signal having a frequency associated with the calibration measurement. The VCO circuitry may be configured to modulate an impedance of the tag antenna according to a timing parameter selected based on the frequency of the calibration output signal from the calibration VCO. The sensor VCO and calibration VCOs may be separate VCOs, or they may be the same VCO which is configured to receive alternating inputs (one associated with the sensor measurement, and one associated with the calibration measurement).

Controlling the impedance modulation of the tag antenna to include one of the sensor modulation component or the calibration modulation component may comprise modulating the impedance of the tag antenna based on the operating voltage. Controlling the impedance modulation of the tag antenna to include the sensor modulation component may comprise modulating the impedance of the tag antenna based on the operating voltage. Controlling the impedance modulation of the tag antenna to include the calibration modulation component may comprise modulating the impedance of the tag antenna based on a reference voltage. The tag may be configured to clamp a voltage from the power conversion circuitry to the VCO circuitry to provide the reference voltage. The controller may be configured to: (i) determine an indication of a degree of separation based on an obtained indication of both the operating voltage and the reference voltage. The tag may further comprise a sensor configured to obtain an indication of the sensed parameter. The VCO circuitry may be configured to control the impedance modulation of the tag antenna based on the obtained indication of the sensed parameter from the sensor.

Controlling the impedance modulation of the tag antenna to include the sensor modulation component may comprise modulating the impedance of the tag antenna based on both the operating voltage and the obtained indication of the sensed parameter from the sensor.

Controlling the impedance modulation of the tag antenna to include the calibration modulation component may comprise modulating the impedance of the tag antenna based on the operating voltage. The sensor may be arranged to vary at least one electrical property of the input provided to the VCO circuitry and/or of the VCO circuitry itself based on its obtained indication of the sensed parameter. The sensor may be configured to vary at least one of: (i) a voltage provided to the VCO circuitry, (ii) a current provided to the VCO circuitry, (iii) a resistance associated with the VCO circuitry, (iv) a capacitance associated with the VCO circuitry, and (v) an impedance associated with the VCO circuitry.

The VCO circuitry may comprise a sensor VCO and a calibration VCO. Controlling the impedance modulation of the tag antenna to include the sensor modulation component may comprise modulating the impedance of the tag antenna using the sensor VCO. Controlling the impedance modulation of the tag antenna to include the calibration modulation component may comprise modulating the impedance of the tag antenna using the calibration VCO. The tag may comprise one or more switches operable to provide sequential impedance modulation of the tag antenna from the calibration VCO and the sensor VCO. The tag may comprise logic configured to provide combined impedance modulation of the tag antenna based on impedance modulation from both the calibration VCO and the sensor VCO.

The controller may be configured to determine a degree of separation between the reader and the tag based on a determined indication of the magnitude of operating voltage. The tag may further comprise a data store storing identifier data for the tag. The VCO circuitry may be configured to control the impedance modulation of the tag antenna based also on the stored identifier data for the tag. The tag may be provided at least in part on a flexible substrate, optionally wherein the tag comprises a plurality of n-type metal oxide thin film transistors.

In an aspect, there is provided a method of determining a degree of separation between a tag and a reader, the method comprises: operating a reader antenna of the reader to transmit a carrier signal for activating the tag; receiving the carrier signal at a tag antenna of the tag and using power harvesting circuitry of the tag to obtain an operating voltage from the received carrier signal, wherein a magnitude of the operating voltage is based on a carrier signal field strength at the tag antenna; applying a VCO voltage to a voltage-controlled oscillator, VCO, of VCO circuitry of the tag, wherein the VCO voltage is based on the operating voltage and the VCO is arranged to generate an output signal having a frequency which varies based on the operating voltage, and using the VCO circuitry to modulate an impedance of the tag antenna according to a timing parameter selected based on the frequency of the output signal from the VCO; detecting changes in the reader antenna impedance to obtain an indication of one or more changes in the tag antenna impedance; and determining a degree of separation between the tag and the reader based on an obtained indication of a timing parameter associated with the obtained indication of changes in the tag antenna impedance.

The VCO voltage may be applied to the voltage-controlled oscillator, VCO, circuitry of the tag to provide impedance modulation of the tag antenna, wherein a timing parameter for the impedance modulation of the tag antenna is dependent on the magnitude of the VCO voltage. The VCO voltage may be the operating voltage, or it may be a voltage which is based on that operating voltage. For example, the power harvesting circuitry of the tag may be coupled (e.g. directly) to the VCO so that the operating voltage obtained by the power harvesting circuitry is the voltage applied to the VCO. As another example, the power harvesting circuitry of the tag may be coupled (e.g. indirectly) to the VCO so that the operating voltage obtained by the power harvesting circuitry is adjusted (e.g. increased or decreased) prior to being provided to the VCO (e.g. the operating voltage may also be used to power one or more other components of the tag, thus leading to a smaller voltage being applied to the VCO as the VCO voltage).

The magnitude of the operating voltage obtained by the power harvesting circuitry (and also a magnitude of the VCO voltage applied to the VCO) may vary depending on the carrier signal field strength at the tag antenna. The carrier signal field strength at the tag antenna is based on a magnitude of the carrier signal field and a direction of the tag antenna relative to the carrier signal field. For example, a magnitude of the operating voltage obtained by the power harvesting circuitry may be based on a magnitude of the carrier signal field strength at the tag antenna and/or a direction of the tag antenna relative to the carrier signal field. The magnitude of the carrier signal field strength will vary based on a degree of separation between the tag antenna and the reader antenna (e.g. it will decrease as the two move further apart). As such, a magnitude of the operating voltage may be based on a magnitude of the field strength in the region of the tag antenna, and thus a degree of separation between the tag antenna and the reader antenna. For example, for a fixed direction of the tag antenna relative to the carrier signal field, the operating voltage may vary based on a magnitude of the carrier signal field at the location of the tag antenna (and thus e.g. a distance separating the tag antenna from the reader antenna. The method may comprise identifying an indication of a timing parameter associated with the changes in the tag antenna impedance as detected at the reader antenna; and determining a degree of separation between the reader and tag based on the identified timing parameter. For example, this may be determined based on a difference between: (i) a magnitude of the carrier signal field strength at the tag antenna (e.g. a magnitude of the field that gave rise to the identified timing pattern), and (ii) a magnitude of the corresponding carrier signal field strength at a fixed reference location, such as at the reader antenna, or a known position with a fixed offset relative to the reader antenna.

In an aspect, there is provided a method of using a reader to obtain sensor data from a tag. The method comprises: operating a reader antenna of the reader to transmit a carrier signal for activating the tag; receiving the carrier signal at a tag antenna of the tag and using power harvesting circuitry of the tag to obtain an operating voltage from the received carrier signal, wherein a magnitude of the operating voltage is based on a carrier signal field strength at the tag antenna; applying the operating voltage to a voltage-controlled oscillator, VCO, of VCO circuitry of the tag, wherein the VCO voltage is based on the operating voltage and the VCO is arranged to generate an output signal having a frequency which varies based on the operating voltage, and using the VCO circuitry to modulate an impedance of the tag antenna according to a first timing parameter selected based on the frequency of the output signal from the VCO; detecting changes in the reader antenna impedance to obtain an indication of one or more changes in the tag antenna impedance, and identifying an indication of a first timing parameter associated with said obtained indication of changes in the tag antenna impedance; operating a sensor of the tag to adjust one or more electrical properties of the VCO circuitry of the tag based on sensor data obtained by the sensor, and modulating an impedance of the tag antenna according to a second timing parameter selected based on the sensor data obtained by the sensor; detecting changes in the reader antenna impedance to obtain an indication of one or more changes in the tag antenna impedance, and identifying an indication of a second timing parameter associated with said obtained indication of changes in the tag antenna impedance; and determining an indication of the sensor data obtained by the sensor of the tag based on both the indication of the first timing pattern and the indication of the second timing pattern.

In an aspect, there is provided a tag configured for use in any of the sensor systems disclosed herein. In an aspect, there is provided a reader configured for use in any of the sensor systems disclosed herein. Aspects of the present disclosure also provide one or more computer program products comprising computer program instructions configured to program a controller to implement any of the methods disclosed herein (e.g. such as the aspects mentioned above).

BRIEF DESCRIPTION OF THE SEVERAL VIEWS OF THE DRAWINGS

Some examples of the present disclosure will now be described, by way of example only, with reference to the figures, in which.

In the drawings like reference numerals are used to indicate like elements.

DESCRIPTION OF SPECIFIC EMBODIMENTS OF THE INVENTION

Overview

The present disclosure relates to sensor systems comprising a reader and a tag. Such sensor systems may be provided using simpler, smaller and/or cheaper componentry which may communicate relevant information without requiring excessive complexity. In particular, simpler mechanisms for transmitting information about sensed parameters between reader and tag are utilised by sensor systems of the present disclosure.

An exemplary sensor system will first be described in general terms with reference to FIG. 1.

Figure 1:
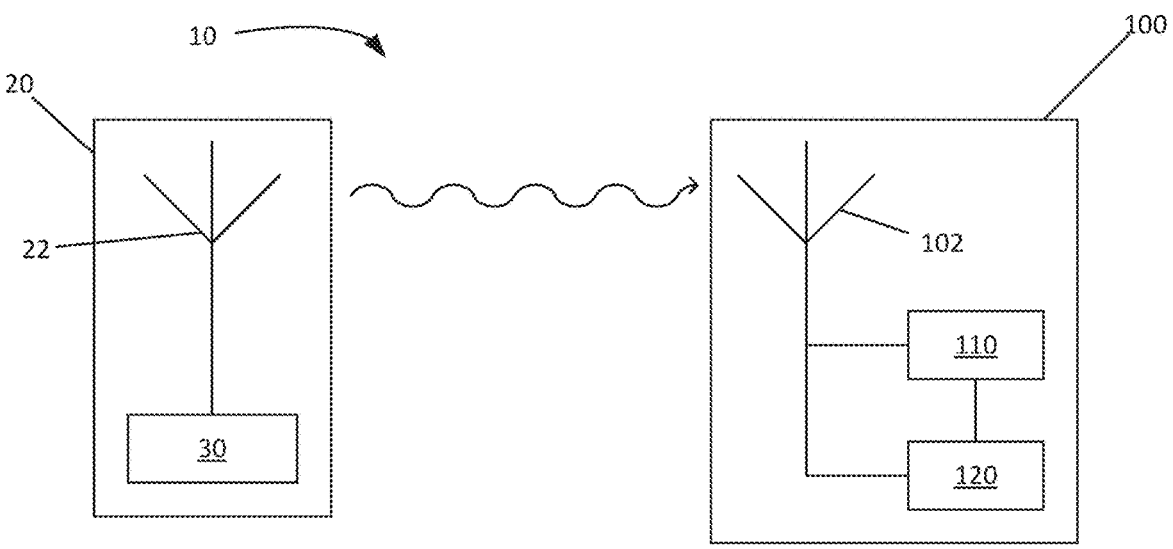
FIG. 1 is a schematic diagram illustrating an exemplary sensor system.

FIG. 1 shows a sensor system 10 comprising a reader 20 and a tag 100. The reader 20 and tag 100 are arranged to communicate with each other. In particular, the reader 20 has a reader antenna 22, and the tag 100 has a tag antenna 102. The reader 20 uses the reader antenna 22 to generate an electromagnetic field for interacting with the tag 100. The tag 100 uses the tag antenna 102 to couple with this electromagnetic field generated by the reader 20. In this sense, the reader 20 is arranged to transmit a carrier signal to the tag 100.

The tag 100 includes power harvesting circuitry 110, such as one or more rectifiers, for harvesting power from electromagnetic fields. The power harvesting circuitry 110 will generate a DC output based on a current generated in the tag antenna 102 resulting from the electromagnetic field interacting with the tag antenna. This DC output may be in the form of an operating voltage used for powering one or more components of the tag 100. The power harvesting circuitry 110 is arranged so that a magnitude of the operating voltage will be dependent on a strength of the electromagnetic field at the tag antenna 102. The strength of the electromagnetic field at the tag antenna 102 may vary based on a magnitude of the field in the vicinity of the tag antenna 102 and a position (e.g. orientation) of the tag antenna 102 relative to the electromagnetic field (e.g. to the reader antenna 22). In other words, a magnitude of the operating voltage will correspond to the field strength in the vicinity of the tag antenna (the operating voltage will increase in magnitude for a higher field strength). In turn, the magnitude of this operating voltage will be dependent on the strength of the electromagnetic field generated by the reader 20 and a degree of separation between the reader 20 and tag 100 (the electromagnetic field strength will decrease with increased separation of the tag antenna 102 from the reader antenna 22). Therefore, for a known field strength being generated at the reader antenna 22, the operating voltage generated by the power harvesting circuitry 110 will correspond to a degree of separation between the reader 20 and tag 100 (the reader antenna 22 and the tag antenna 102). For example, a high operating voltage may indicate a high field strength at the tag antenna 102 (e.g. a high magnitude field in the vicinity of the tag antenna 102).

The operating voltage provides power to one or more components of the tag 100. The tag 100 also includes voltage-controlled oscillator ('VCO') circuitry 120. The VCO circuitry 120 will modulate an impedance of the tag antenna 102 so that a property of that impedance modulation of the tag antenna 102 is indicative of information, such as a value of a sensed parameter, to be transmitted from the tag 100 to the reader 20. The sensor system 10 is configured to use the tag 100 to obtain an indication of a sensed parameter. Information transmitted from tag 100 to reader 20 will thus be indicative of the sensed parameter. The VCO circuitry 120 of the tag 100 may, for example, be configured to provide load modulation of the tag antenna 102, wherein a property of the modulation represents the information to be transmitted. An example of property of the modulation to represent the information comprises a timing parameter, such as an amount of time between adjacent pulses being applied to the tag antenna 102, or a duration of pulses being applied to the tag antenna 102.

The sensor system 10 also includes a controller 30 coupled to the reader antenna 22. The controller 30 may form part of the same component as the reader 20 itself or they may be different components. The controller 30 is arranged to detect, at the reader antenna 22, a resulting signal which is indicative of the impedance modulation being applied to, and hence the information transmitted by, the tag antenna 102. The VCO circuitry 120 may be configured to provide load modulation of the tag antenna, and the controller 30 may be configured to detect such modulation as evident at the reader antenna 22, e.g. in the form of a modulated signal received at the reader antenna 22. The controller 30 may, for example, be configured to detect a change in the reader antenna circuit impedance at a frequency of the carrier signal, or a frequency close thereto, caused by changes in a received signal carried by the carrier signal. This change, as measured at the reader antenna 22, will be indicative of the impedance modulation being provided to the tag antenna 102 by the VCO circuitry 120 of the tag 100. As such, the controller 30 may monitor changes in the impedance of the reader antenna 22 to obtain an indication of the impedance modulation being applied to the tag antenna 102. In this sense, data may be transmitted from the tag 100 to the reader 20 in the form of one or more properties of a modulated signal to be detected by the reader 20.

The controller 30 is configured to identify the presence of impedance changes in the reader antenna 22, and to use these to determine an indication of the impedance modulation being applied at the tag 100. In other words, the controller 30 is configured to infer the presence of impedance changes being applied to the tag antenna 102 based on observed changes to the impedance of the reader antenna 22. As one example, the VCO circuitry 120 may be configured to apply pulses to the tag antenna 102, with a separation timing between adjacent pulses being a property of the modulation which is to be varied based on the sensed parameter. In which case, the controller 30 may determine an indication of the sensed parameter based on a separation timing between chronologically adjacent changes in impedance as registered at the reader antenna 22. It is to be appreciated in the context of the present disclosure that the property of the impedance modulation being applied to the tag antenna 102 may be one of a number of different properties. For example, the impedance may be modulated according to a timing parameter which is selected based on a data rate or frequency associated with the VCO circuitry 120 (e.g. with a VCO of the VCO circuitry 120). In other words, a VCO of the VCO circuitry may generate an output signal having e.g. an associated frequency. The timing parameter may be selected based on a property of that VCO output signal (e.g. based on a frequency of that output signal). The controller 30 may determine the timing parameter associated with the impedance modulation accordingly. For example, the controller 30 may use a look up table to determine a value of the sensed parameter based on the identified property of the modulation being applied to the tag antenna 102. For example, the look up table may provide a mapping between an identified property of the modulation and a value for the sensed parameter.

As set out above, by selectively controlling the impedance modulation of the tag antenna 102 based on a sensed parameter, an indication of the sensed parameter may be obtained using the controller 30 to monitor changes in impedance of the reader antenna 22.

The tag 100 is arranged to enable transmission of data representing the sensed parameter. Operation of the tag 100 may therefore comprise obtaining an indication of the sensed parameter and controlling impedance modulation of the tag antenna 102 to reflect said obtained indication of the sensed parameter. The VCO circuitry 120 includes one or more voltage-controlled oscillators configured to provide an output signal, where that output signal is used for applying impedance modulation to the tag antenna 102. A feature of that output signal will depend, at least in part, on at least one of the following properties: (i) a magnitude of the voltage applied to the VCO, and (ii) one or more electrical parameters of that VCO itself (e.g. a resistance, capacitance, flow of current etc.). The tag 100 is arranged to vary at least one of these properties based on the obtained indication of the sensed parameter.

The feature of the output signal may be indicative of the operating voltage applied to the VCO and/or of the one or more electrical parameters of the VCO. The feature of the output signal may be a temporal property such as a time gap between adjacent pulses, a duration of each pulse, a signal frequency, and/or a data rate of the signal. In particular, the VCO circuitry 120 is configured to provide impedance modulation of the tag antenna 102. For example, an amount of time between adjacent pulses being applied to the tag antenna 102 may be indicative of a voltage being applied to the VCO and/or the one or more electrical parameters of the VCO.

The sensed parameter, and the property of the impedance modulation to be varied based on said sensed parameter, may take a number of different forms. Likewise, how the tag 100 is arranged to transmit information representing the sensed parameter may be provided in a number of different ways. Specific examples are described later on with reference to FIGS. 2 to 4, but such examples will now be briefly described with reference to FIG. 1 (where relevant).

The sensed parameter may be indicative of a degree of separation between the reader 20 (reader antenna 22) and the tag 100 (tag antenna 102). For this, an indication of electric field strength (the field generated by the reader antenna 22), as detected at the tag antenna 102, may be used as the sensed parameter (for providing an indication of the degree of separation). In which case, the sensed parameter may be inferred based on a magnitude of the operating voltage as obtained from the tag antenna 102 by the power harvesting circuitry 110. In other words, the sensed parameter to be identified by the controller may be a magnitude of the operating voltage obtained by the power harvesting circuitry 110.

The VCO circuitry 120 may provide impedance modulation of the tag antenna 102, wherein a property of that impedance modulation is controlled based on the magnitude of the operating voltage (e.g. as supplied to a VCO of the VCO circuitry 120). For example, the VCO may provide impedance modulation having a frequency, data rate, pulse duration and/or time gap between adjacent pulses which varies in dependence on a magnitude of the operating voltage. For example, an amount of time between adjacent pulses being applied to the tag antenna 102 may be indicative of the operating voltage being applied to the VCO. This may be detected at the reader antenna 22 using controller 30 to obtain an indication of the degree of separation between reader 20 and tag 100.

Other parameters may be sensed. For example, the tag 100 may further comprise a sensor, and the sensed parameter may be obtained using that sensor. In which case, the sensor and the VCO circuitry 120 may work together to transmit an indication of the sensed parameter. For example, the VCO circuitry 120 and the sensor may be arranged to provide impedance modulation of the tag antenna 102, wherein a property of that impedance modulation is controlled based on measurements of the sensed parameter obtained by the sensor.

The sensor may be electrically connected with the VCO circuitry 120 so that at least one electrical property of the VCO circuitry 120, or the input signal provided to the VCO circuitry 120, varies based on measurements obtained by the sensor. In other words, the sensor and VCO circuitry 120 may be arranged so that a measurement obtained by the sensor affects at least one of: (i) a magnitude of the voltage applied to a VCO of the VCO circuitry 120, and (ii) one or more electrical parameters of that VCO itself (e.g. a resistance, capacitance, flow of current etc.).

For example, the sensor may provide an output signal having a magnitude indicative of the measurement of the sensed parameter, e.g. a current or voltage. The output signal from the sensor may be used to vary the input signal (e.g. an input voltage) provided to a VCO of the VCO circuitry 120. For example, another electrical parameter, such as a capacitance or resistance, may vary based on the measurement of the sensed parameter. The tag may be arranged so that this variable electrical parameter also acts to vary the impedance modulation to be applied by the VCO circuitry 120. For example, by varying one of: current flow, resistance, capacitance etc. within the VCO, the output of that VCO may vary (despite the operating voltage being obtained by the power harvesting circuitry 110 remaining constant, and thus the voltage being provided to the VCO remaining constant). Alternatively, or additionally, the electrical parameter may vary the input to the VCO (e.g. variable resistance providing changes to the input voltage etc.).

As set out above, the tag 100 may provide impedance modulation having a property controlled based on an obtained measurement of a sensed parameter. This measurement of the sensed parameter may be obtained using the power harvesting circuitry 120 and/or a sensor of the tag 100.

In some examples described later on in more detail, the tag 100 may also provide impedance modulation of the tag antenna 102 for calibration of the measurement of the sensed parameter. To provide such calibration, the tag antenna impedance may be modulated based on a calibration signal. Tag antenna calibration may be provided in a number of different ways.

For example, the tag 100 may be configured to provide sequential modulation, in which the tag antenna impedance is modulated first according to the measurement of the sensed parameter, and then secondly according to the calibration signal (or in the other order). In which case, the reader 20 and controller 30 may be configured to identify the presence of two different modulation properties in sequence, and to determine an indication of both the measurement of the sensed parameter and the calibration signal.

For example, the tag 100 may be configured to provide combined modulation, in which the tag antenna impedance is modulated based on both the measurement of the sensed parameter and the calibration signal at the same time. In which case, the reader 20 and controller 30 may be configured to identify the presence of one modulation property which is indicative of both the measurement of the sensed parameter and the calibration signal.

For example, the calibration signal may be in the form of a reference voltage (e.g. a clamped voltage) being provided to a VCO. A temporal output of the VCO may therefore conform to an expected value when the reference voltage is being applied thereto (based on a known value for the reference voltage). Any deviation from this expected value for the calibration signal may be used to calibrate the measurement signal (e.g. if temperature etc. causes changes to the impedance modulation). The measurement signal may then be indicative of a magnitude of the operating voltage (e.g. for sensing a degree of separation between reader 20 and tag 100). The calibration signal may be used to calibrate this measurement signal so that a difference between the measurement and calibration signals, as identified by the reader 20, will reflect a difference in magnitude between the operating and reference voltages. The controller 30 may determine a calibrated measurement signal based on both of these voltages.

For example, the calibration signal may be in the form of the operating voltage being applied to a VCO. The measurement signal may be in the form of the operating voltage and the measurement from the sensor being applied to a VCO. The controller 30 and reader 20 may be configured to calibrate the measurement signal using the calibration signal (indicative of operating voltage) to remove a component of the measurement signal which varies based on a degree of separation between the reader 20 and the tag 100.

Examples of the disclosure described above make use of a relationship between a degree of separation of a tag from a reader to communicate an indication of a sensed parameter from a tag to a reader. The tag may effectively communicate an indication of a degree of separation between itself and the reader by providing a modulation which represents, at least in part, a measurement of field strength at the tag resulting from the field generated by the reader. For example, the tag may provide modulation representative of a sensor measurement, where that sensor measurement is a degree of separation between reader and tag. For example, the tag may provide modulation representative of a sensor measurement and also of the degree of separation between tag and reader. In the latter case, communicating an indication of field strength may be used for calibrating sensor measurement data being communicated from the tag to the reader.

Figure 2:
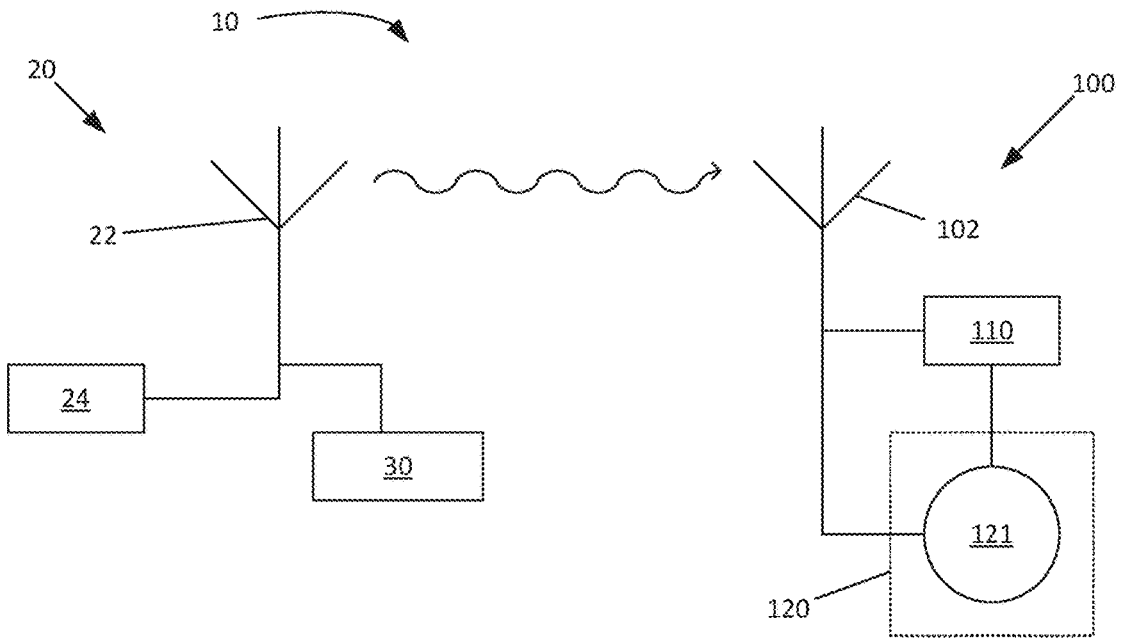
FIG. 2 is a schematic diagram illustrating an exemplary sensor system.

More detailed description of the present disclosure will now be provided with reference to FIGS. 2 to 4.

Sensing Degree of Separation Between Reader and Tag

FIG. 2 shows a sensor system 10. The sensor system 10 comprises a reader 20, a controller 30, and a tag 100.

The reader 20 comprises a reader antenna 22 and signal driving circuitry 24.

The tag 100 comprises a tag antenna 102, power harvesting circuitry 110, and a voltage-controlled oscillator circuitry 120 ('VCO circuitry'). The VCO circuitry 120 comprises a first voltage-controlled oscillator 121 ('first VCO').

The reader 20 and tag 100 are separate components. At the reader-side, the signal driving circuitry 24 is electrically connected to the reader antenna 22, as is the controller 30. At the tag-side, the power harvesting circuitry 110 is electrically connected to the tag antenna 102, as is the VCO circuitry 120. The power harvesting circuitry 110 is electrically connected to the first VCO 121.

The signal driving circuitry 24 is configured to selectively apply a current or voltage to the reader antenna 22 to cause the reader antenna 22 to transmit a carrier signal at a selected frequency.

The tag antenna 102 is configured to interact with the electric field generated by the reader antenna 22 transmitting the carrier signal. In so doing, a voltage will be induced across the terminals of the tag antenna 102. The power harvesting circuitry 110 is coupled to the tag antenna 102 and arranged to harvest power therefrom. The power harvesting circuitry 110 may comprise one or more rectifiers. The power harvesting circuitry 110 is configured to harvest power from the tag antenna 102, and to provide, as its output an operating voltage. The operating voltage comprises a DC voltage having a magnitude based on a strength of the electric field at the tag antenna 102 from which power is harvested. The power harvesting circuitry 110 is thus configured to provide an operating voltage having a magnitude indicative of the electric field strength in the vicinity of the tag antenna 102.

The power harvesting circuitry 110 is connected to the first VCO 121 to provide the operating voltage to the first VCO 121. The first VCO 121 is configured to provide an output having at least one property which is dependent on a magnitude of the voltage it receives as its input. The VCO circuitry 120 is arranged to enable the output from the first VCO 121 to be used in modulating an impedance of the tag antenna 102. For example, the VCO circuitry output may be in the form of one or more pulses being applied to a conductor electrically connected to the tag antenna 102 to modulate an impedance of the tag antenna 102. The first VCO 121 may be arranged to regulate a temporal property of these pulses in dependence on the magnitude of the operating voltage. The temporal property may relate to a frequency with which pulses are applied. For example, the VCO circuitry 120 may apply each pulse for a selected duration and then have an interval of a selected duration which separates adjacent pulses. The temporal property may comprise a length of time for which each pulse is applied and/or it may comprise a length of time which separates adjacent pulses being applied.

In one example, the VCO circuitry 120 may be configured to generate an output signal having well-defined transitions between a relatively high level and a relatively low level. The VCO circuitry 120 may be configured to process output signals from the VCOs of the VCO circuitry (e.g. first VCO 121). The VCO circuitry may be arranged to provide a 'cleaned' version of the output from the first VCO 121 as the output signal from the VCO circuitry. For example, the VCO circuitry may comprise one or more inverters, buffers and/or comparators for cleaning the signal output from the first VCO.

The output signal from the VCO circuitry 120 may be used to drive the control terminal of a modulator switch. As one example, the control terminal of the modulator switch may comprise the gate terminal of a transistor, the conducting terminals of which are each connected to respective + and − terminals of the antenna so as to form a short circuit across the antenna terminals when the switch is closed and an open circuit across the antenna terminals when the switch is open. In this way the output of the VCO circuitry 120 may be used to directly modulate the tag antenna impedance whilst the tag 100 is receiving sufficient power from the reader 20. The controller 30 may be configured to identify and count the transitions or edges of changes in measurements of the impedance of the reader antenna 22. A frequency or duration associated with the transitions may be used to indicate a degree of separation between the tag 100 and reader 20. It will be appreciated that a tag according to this example may comprise an integrated circuit. Such an integrated circuit may be of extremely simple and low cost design.

In another example the VCO circuitry 120 may generate an encoded output signal that represents data, for example by making use of digital circuitry. The output from the first VCO 121 may be used in the generation of a timing signal or clock signal for such digital circuitry. The digital circuitry may in turn be used to generate the encoded output signal from the VCO circuitry 120, which may be used to modulate the tag antenna impedance. The controller 30 may be configured to demodulate and decode the variation in impedance of the reader antenna 22 in order to retrieve the data encoded in the VCO circuitry output signal. In this way a frequency or duration associated with the variation in impedance of the reader antenna 22 may be used to indicate a degree of separation between the tag 100 and reader 20, and the retrieved data may be used to identify the tag or other information present in the data.

In the example of FIG. 2, the parameter to be sensed is an indication of a degree of separation between the tag 100 and reader 20. Sensing an indication of the degree of separation will be based on a measurement of field strength—the strength of the field generated by the reader antenna 22 as measured at the tag antenna 102. As will be appreciated in the context of the present disclosure, one or more properties representing a degree of separation between tag 100 and reader 20 may be inferred based on a measurement of the field strength. For example, using the obtained measurement for degree of separation, the controller 30 may be configured to determine a linear distance separating the reader 20 from the tag 100 (e.g. as the field strength will decrease with increased separation distance). As another example, the controller 30 may be configured to determine an indication of a permittivity for an intervening substance between the reader 20 and the tag 100 (e.g. as the intervening permittivity will affect the rate at which field strength decreases with increased separation distance). As another example, the controller 30 may be configured to determine an indication of an angular offset between the plane in which the tag antenna 102 is oriented and the plane in which the reader antenna 102 is oriented (e.g. as the energy harvested will decrease as the antennas approach orthogonality with each other). It will be appreciated that one or more of these properties may be inferred from an obtained indication of the degree of separation. For example, a degree of separation between the reader 20 and tag 100 may have one or more fixed properties (e.g. fixed separation distance/intervening permittivity/angular offset). As such, changes in the obtained indication may be attributed to changes in the relevant parameter or parameters.

In this example, the degree of separation will be taken to be a straight-line distance between the reader 20 and the tag 100. The electric field strength at the tag antenna 102 associated with the carrier signal will be at least partially indicative of a distance separating the tag antenna 102 from the reader antenna 22. This field strength will decrease with increased separation distance between the two antennas. As such, the operating voltage provided by the power harvesting circuitry 110 will have a magnitude which is also indicative of the distance separating the tag antenna 102 from the reader antenna 22. In turn, the first VCO 121 will provide an output having a temporal property which is indicative of the distance separating the tag antenna 102 from the reader antenna 22 (as its output will be dependent on the magnitude of the operating voltage). In so doing, the tag antenna impedance will be modulated in such a way that its modulation will have a temporal property indicative of the distance separating the tag antenna 102 from the reader antenna 22. As one example of such a temporal property, the VCO circuitry 120 may selectively apply pulses to modulate the tag antenna impedance, and a duration of time separating each pulse may be indicative of the magnitude of the operating voltage (and thus the separation distance).

The controller 30 is coupled to the reader antenna 22 to detect changes in the reader antenna impedance brought about by the tag antenna impedance modulation. In particular, the controller 30 is configured to monitor any changes in impedance of the reader antenna circuitry, as brought about by impedance changes of the tag antenna 102. These changes to reader antenna impedance will typically be at a frequency of the carrier signal, or a frequency close to this carrier signal. The controller 30 is configured to identify such changes to reader antenna impedance, and to predict therefrom an indication of the modulation being applied to the tag antenna 102 which caused such changes to occur. Based on this indication of the applied modulation, the controller 30 is configured to determine an indication of the distance of separation between the tag 100 and reader 20. Determining this distance of separation may comprise the controller 30 using a look-up table which links observed modulation properties to distances of separation. Additionally, or alternatively, the controller 30 may determine an operating voltage which was responsible for such a modulation property being applied. The controller 30 may in turn determine the distance of separation based on this operating voltage.

In operation, the signal driving circuitry 24 applies a signal to the reader antenna 22 to transmit a carrier signal to the tag 100, and the controller 30 monitors changes in reader antenna impedance associated with changes to tag antenna impedance. The tag antenna 102 will receive the carrier signal, and the power harvesting circuitry 110 obtains an operating voltage therefrom having a magnitude indicative of the electric field strength at the tag antenna 102. This operating voltage is used by the first VCO 121 to control a temporal property of impedance modulation of the tag antenna 102 according to the magnitude of the operating voltage. Based on the observed changes in reader antenna impedance brought about by the impedance modulation of the tag antenna 102, the controller 30 determines the degree of separation between reader 20 and tag 100.

Such examples described above may therefore enable simple and efficient means for communicating a degree of separation between tag 100 and reader 20. Simple tag circuitry may be used which does not require expensive or complex components.

Using Calibration for Sensing Degree of Separation Between Reader and Tag

Figure 3A:
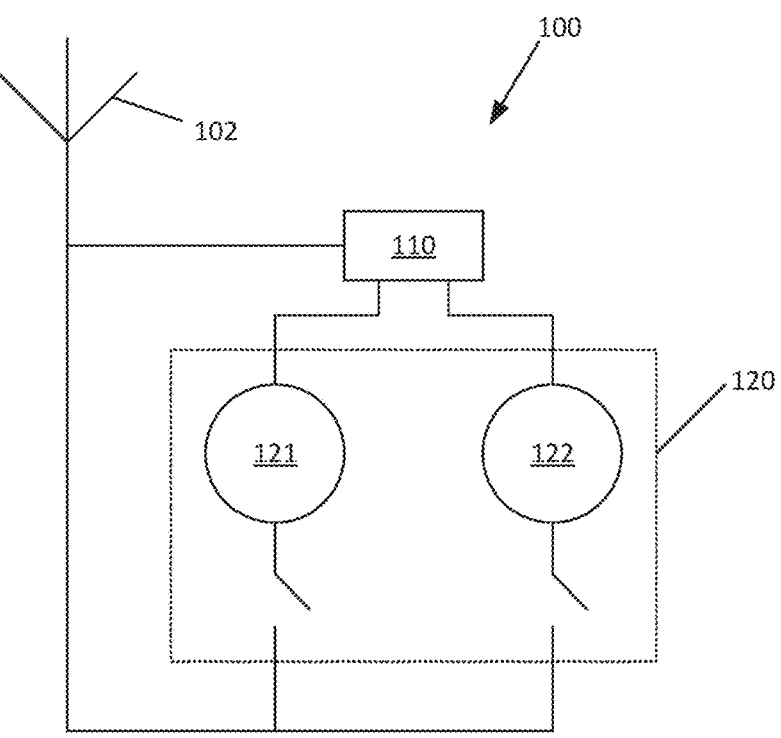
FIGS. 3a and 3b show exemplary tags for use in a sensor system.
Figure 3B:
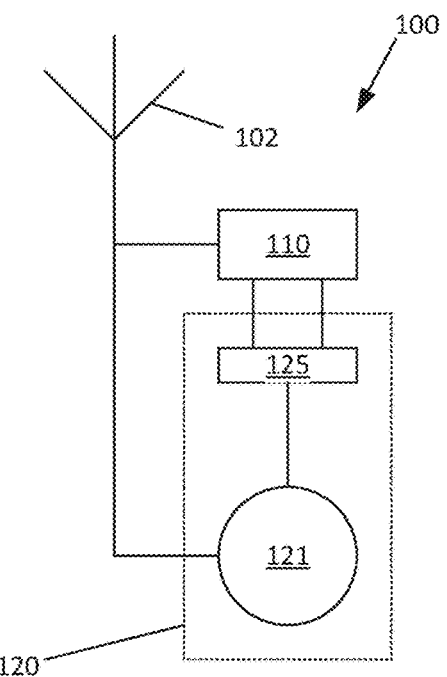

FIGS. 3a and 3b show exemplary tags configured to provide calibration for measurements of degree of separation between reader 20 and tag 100.

FIG. 3a shows a tag 100 comprising a tag antenna 102 and voltage-controlled oscillator circuitry 120 ('VCO circuitry'). The VCO circuitry 120 comprises a first voltage-controlled oscillator 121 ('first VCO'), and a second voltage-controlled oscillator 122 ('second VCO').

Unlike in the example of FIG. 2, the tag 100 has two VCOs. The VCO circuitry 120 comprises a plurality of switches for controlling operation of the VCOs. The switches are shown between VCOs and antenna, but it is to be appreciated that they could be provided in any suitable location, such as between the power harvesting circuitry 110 and the VCOs. In this example, the first VCO 121 is a sensor VCO and the second VCO 122 is a calibration VCO. Separate conduction paths are provided from the power harvesting circuitry 110 to the sensor VCO and from the power harvesting circuitry 110 to the calibration VCO.

As disclosed herein, the VCO circuitry 120 may be arranged to control impedance modulation of the tag antenna 102 based on an output from one or more VCOs of the VCO circuitry 120. For example, this may comprise the VCO circuitry 120 providing a cleaned VCO output signal, and/or the use of VCOs to generate digital clock signals. In this sense, each of the VCOs of the VCO circuitry 120 (e.g. first VCO 121 and second VCO 122) may be arranged to selectively influence the impedance of the tag antenna 102. In other words, the VCO circuitry 120 may be arranged to switch in and out the different VCOs (first VCO 121 and second VCO 122) to enable the impedance modulation of the tag antenna to be controlled based on the output from each of the VCOs. For example, each of the VCOs may be used to control impedance modulation of the tag antenna 102 sequentially in time (e.g. the VCO circuitry 120 may be arranged to control the impedance modulation of the tag antenna 102 based on an output from the first VCO 121 during a first time period, and during a second, different time period, the VCO circuitry 120 may control the impedance modulation of the tag antenna 102 based on an output from the second VCO 122). The controller 30 may be arranged to detect an indication of a difference between these different periods of tag antenna 102 impedance modulation (e.g. to identify an indication of the respective contributions from the first VCO 121 and the second VCO 122).

As with the example of FIG. 2, the power harvesting circuitry 110 is configured to harvest power from the tag antenna 102. The power harvesting circuitry 110 is configured to generate an operating voltage having a magnitude indicative of the field strength at the tag antenna 102. The power harvesting circuitry 110 is coupled to the first VCO 121 (sensor VCO) to provide the operating voltage to the sensor VCO. The power harvesting circuitry 110 is configured to provide a reference voltage to the second VCO 122 (calibration VCO). For example, a voltage clamp may be provided so that the voltage provided to the calibration VCO does not exceed a threshold level. The threshold level may be selected to be sufficiently low so that, during normal operation, the operating voltage will be greater in magnitude than the reference voltage.

As with the example of FIG. 2, each VCO is configured to provide an output signal having a property indicative of the magnitude of the voltage supplied to that VCO. The property may be a temporal property such as a pulse duration or an interval duration between adjacent pulses. The sensor VCO will provide an output indicative of a magnitude of the operating voltage and the calibration VCO will provide an output indicative of a magnitude of the reference voltage. As the reference voltage is clamped to a fixed value, the output from the calibration VCO should not vary based on its input (e.g. because the input voltage to the calibration VCO will remain constant). As such, the tag 100 is arranged so that any changes in operating conditions to the VCOs (e.g. due to fluctuations in temperature etc.) will be apparent with reference to changes in the output from the calibration VCO.

The tag 100 is configured to provide sequential modulation of the tag antenna 102 from the two VCOs. The tag 100 may comprise logic configured to control operation of each switch. In particular, the tag 100 may be configured to operate the switches so that a first VCO is connected to the tag antenna 102 to modulate the impedance thereof for a selected duration of time while a second VCO is not connected to the tag antenna 102. After the selected duration of time has passed, the logic may control operation of the switches to change so that the second VCO is connected to the tag antenna 102 to modulate the impedance thereof for a selected duration of time while the first VCO is not connected to the tag antenna 102. Each VCO may be connected to the tag antenna 102 for the same amount of time, or a different amount of time (e.g. the calibration VCO may be connected for less time).

The operation of each VCO to provide impedance modulation of the tag antenna 102 may be similar to that described above for FIG. 2 and so shall not be described again other than to specify that the impedance modulation property from the sensor VCO will be indicative of the magnitude of the operating voltage (and thus a degree of separation between reader 20 and tag 100), and the impedance modulation property from the calibration VCO will be indicative of the reference voltage (and thus any changes to operating conditions of the calibration VCO compared to a known calibration standard).

The tag 100 is configured to operate to provide sequential impedance modulation of the tag antenna 102. That is, the tag 100 is configured so that the impedance of the tag antenna 102 will vary according to two modulation properties. Firstly, a property of the modulation of the tag antenna 102 will be controlled to be indicative of one of the operating voltage or the reference voltage. Secondly, a property of the modulation of the tag antenna 102 will be controlled to be indicative of the other voltage. This process may be repeated a plurality of times.

The controller 30 is configured to detect changes in reader impedance, as described above with reference to FIG. 2. In addition, the controller 30 is configured to categorise the detected changes as either applying to sensor VCO modulation or calibration VCO modulation. The calibration VCO modulation may have an expected property, and so the controller 30 may identify the calibration signal as being the signal at or close to the expected property (e.g. pulse duration etc.). As set out above, the calibration VCO may have an output associated with a lower voltage than the operating voltage. As such, the controller 30 may identify the calibration signal as being the signal associated with the lower VCO voltage input. The controller 30 may have stored data indicative of how long each VCO output is provided to the tag antenna 102. Based on this, the controller 30 may be able to identify separate response signals: one from the calibration VCO and one from the sensor VCO.

The controller 30 is configured to compare the calibration VCO signal to the expected property for the calibration VCO signal (e.g. as stored in a data store of the controller 30). The controller 30 may be configured to determine an amount of deviation between the expected calibration signal and the measured calibration signal. The controller 30 may then be configured to apply a corresponding amount of calibration to the sensor signal to the deviation measured for the calibration signal. The controller 30 is configured to use the calibration signal to calibrate the measurement signal. The controller 30 may then use the calibrated measurement signal to provide an indication of the degree of separation between the reader 20 and tag 100. Tags may be identified from their calibration signals, for example from the frequencies of their calibration signals. This may be convenient in systems employing more than one tag 100, and may be especially useful for tags that do not have any other form of identification, such as an identification code stored in a memory in an integrated circuit of the tag.

Such examples described above may enable improved reliability for the indication of the sensed parameter as obtained from the tag 100. These examples may enable calibration to occur which allows for fluctuations in measurement values brought about by environmental conditions (pressure, temperature etc.), rather than by the degree of separation between the reader 20 and tag 100.

Another example of a tag 100 arranged to allow calibration of sensor measurements will now be described with reference to FIG. 3*b*.

FIG. 3*b* shows a tag 100 comprising a tag antenna 102, power harvesting circuitry 110, and voltage-controlled oscillator circuitry 120 ('VCO circuitry'). The VCO circuitry 120 comprises a first voltage-controlled oscillator 121 ('first VCO'), and VCO input logic 125.

As with the tag 100 of FIG. 3*a*, the tag 100 is configured to provide sequential impedance modulation of the tag antenna 102. The tag 100 of FIG. 3*b* has only one VCO, but it includes VCO input logic 125 configured to control the voltage provided to the first VCO 121. The power harvesting circuitry 110 and the VCO input logic 125 are arranged to switch the voltage provided to the first VCO 121 between: (i) an operating voltage having a magnitude dependent on the field strength at the tag antenna 102, and (ii) a reference voltage. The power harvesting circuitry 110 and/or the VCO input logic 125 may be configured to selectively clamp the operating voltage to provide the reference voltage. The VCO input logic 125 may control operation of one or more switches to selectively apply either the operating voltage or the reference voltage to the first VCO 121.

The tag 100 of FIG. 3*b* may thus operate in a manner similar to that of FIG. 3*a* in the sense that it may provide sequential impedance modulation of the tag antenna 102 according to a sensor signal and a calibration signal. The tag 100 of FIG. 3*b* instead uses VCO input logic 125 to sequentially select the input signal to the first VCO 121 so that the VCO sequentially modulates the tag antenna impedance based on the operating voltage, and the reference voltage.

Using Sensor of Tag to Sense Parameter and Calibrating the Sensed Parameter

Figure 4A:
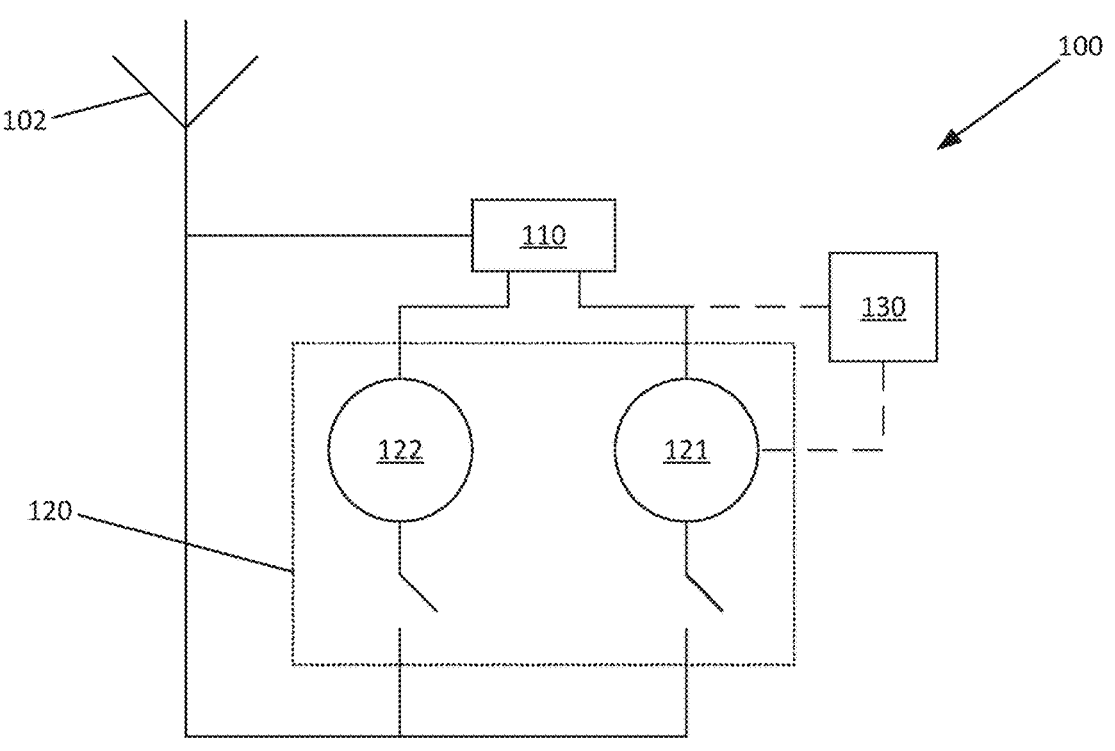
FIGS. 4a and 4b show exemplary tags for use in a sensor system.
Figure 4B:
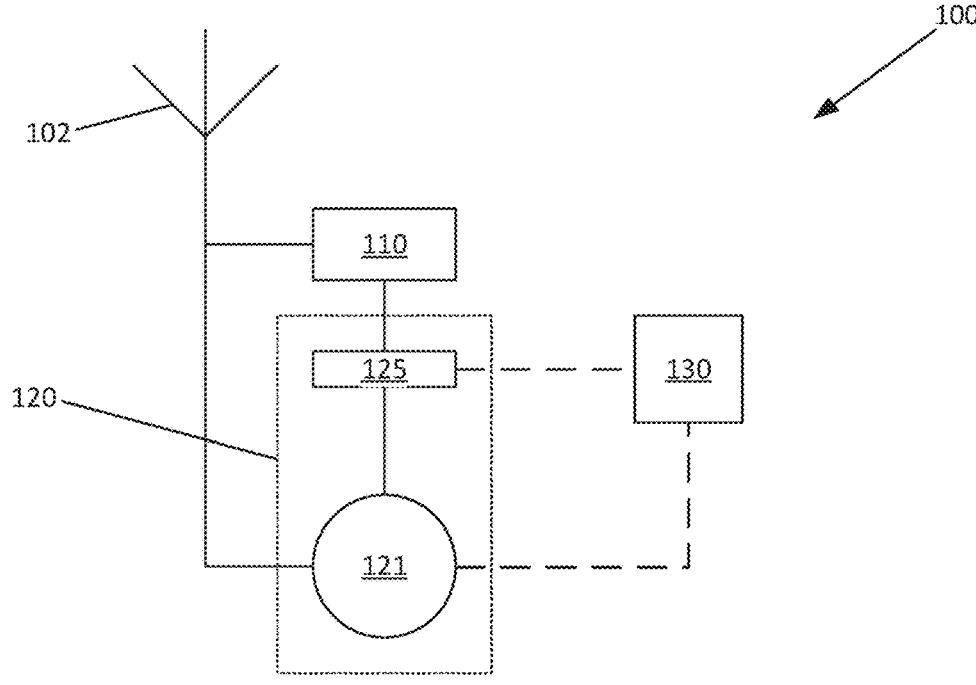

FIGS. 4*a* and 4*b* show exemplary tags having a sensor for obtaining measurements of a sensed parameter. In both FIGS. 4*a* and 4*b*, the tag 100 is configured to provide calibration of a measurement signal obtained from the sensor.

FIG. 4*a* shows a tag 100 comprising a tag antenna 102, power harvesting circuitry 110, voltage-controlled oscillator circuitry 120 ('VCO circuitry'), and a sensor 130. The VCO circuitry 120 comprises a first voltage-controlled oscillator 121 ('first VCO') and a second voltage-controlled oscillator 122 ('second VCO').

The tag 100 of FIG. 4*a* is similar to that of FIG. 3*a* in that the VCO circuitry 120 has two VCOs with respective switches so that the VCOs may be operated to provide sequential impedance modulation of the tag antenna 102. The first VCO 121 is a sensor VCO and the second VCO 122 is a calibration VCO.

Unlike in the tag 100 of FIG. 3*a*, the tag 100 of FIG. 4*a* also includes a separate sensor 130. The sensor 130 is configured to obtain a measurement of a sensed parameter. The sensor 130 is coupled to the first VCO 121 (the sensor VCO) so that operation of the VCO is controlled based also on operation of the sensor 130. The sensor 130 is configured so that an electrical property associated with the sensor 130 will vary in dependence on the obtained measurement of the sensed parameter. The sensor VCO and the sensor 130 are arranged to enable the sensor VCO to provide impedance modulation of the tag antenna 102, wherein a property of that impedance modulation will be at least partially indicative of an obtained measurement of the sensed parameter by the sensor 130.

As with other examples described herein, a property of the impedance modulation provided by each VCO will vary depending on an input voltage provided to that VCO. The power harvesting circuitry 110 is configured to harvest power from the tag antenna 102 to provide an operating voltage. The tag 100 is arranged to provide the operating voltage to the calibration VCO. This is in contrast to the calibration VCO 122 in the example of FIG. 3*a*, to which a reference voltage is provided. The calibration VCO therefore provides impedance modulation of the tag antenna 102 with a property of that impedance modulation being indicative of a degree of separation between the tag 100 and reader 20 (e.g. as per the tag 100 described in FIG. 2).

The sensor VCO is electrically coupled to both the power harvesting circuitry 110 and the sensor 130. An electrical property associated with the sensor 130 will vary in dependence on the obtained measurement of the sensed parameter, and this varying electrical property will influence operation of the sensor VCO. The electrical property associated with the sensor 130 may be a resistance, a capacitance, a current, a voltage etc. It is to be appreciated that a magnitude of this electrical property may provide an indication of a value of the sensed parameter, as measured by the sensor 130. For example, a resistance associated with the sensor 130 may increase in value with an increased measurement value for the sensed parameter.

It is to be appreciated in the context of the present disclosure that the sensor 130 may be arranged to use this measurement-dependent electrical property to influence operation of the sensor VCO in a plurality of different ways. The dashed lines in FIG. 4*a* illustrate two options.

Firstly, the sensor output may be coupled with the input to the sensor VCO. In this sense, the sensor output and the operating voltage may be 'combined' in some way, and the combination may be provided as the input to the sensor VCO. In some examples, additional circuitry may be provided to combine the two. In other examples, a conductive path may be provided between the sensor 130 and the power harvesting circuitry 110, and between a connection between those two and the input to the sensor VCO. For example, where the sensor output is a resistance, the power harvesting circuitry 110 may be connected to the sensor VCO via that variable resistance to enable a voltage drop across that resistance to be detected (e.g. as compared to the calibration VCO output, where that voltage drop did not occur). As another example, the output from the sensor 130 may be in the form of a variable capacitance, and the power harvesting circuitry 110, the sensor capacitance, and the sensor VCO may be arranged as a capacitive divider, such that the input voltage provided to the sensor VCO is dependent on the variable capacitance brought about by the sensor 130.

For such examples, the sensor VCO may be the same as other VCOs described herein (such as the calibration VCO) in that it may provide impedance modulation having a property dependent on a magnitude of the voltage input to that VCO. In these examples, a magnitude of the voltage input to the sensor VCO will be indicative of a sensor measurement as obtained using the sensor 130 of the tag 100.

Secondly, the sensor output may be coupled with circuitry of the sensor VCO itself. The sensor VCO may then receive the operating voltage as its input (as with the calibration VCO), but the circuitry of the sensor VCO may be influenced by the sensor measurement-dependent variable electrical property. In other words, the sensor 130 may be coupled to the sensor VCO so that a difference in output between the calibration VCO and the sensor VCO is indicative of a value for the sensed parameter, as measured by the sensor 130. As will be appreciated, circuitry of the sensor VCO may provide different outputs when a variable electrical property (e.g. capacitance/resistance/voltage/current etc.) is applied thereto.

For such examples, both the sensor VCO and the calibration VCO may receive the same input voltage (the operating voltage), but operation of the sensor VCO may lead to a different property for the impedance modulation applied to the tag antenna 102, as compared to that from the calibration VCO.

In both examples, a difference in one or more modulation properties between modulation applied by the calibration VCO and modulation applied by the sensor VCO will provide an indication of the measurement of the sensed parameter, as obtained by the sensor 130 of the tag 100. The tag 100 is configured to provide sequential impedance modulation of the tag antenna 102 using the sensor VCO and the calibration VCO.

The reader 20 and controller 30 are configured to identify changes in reader antenna impedance to determine the one or more properties of the impedance modulation being applied to the tag antenna 102 by the calibration VCO and the sensor VCO. The controller 30 is configured to identify a difference in the modulation properties being applied by the two VCOs, and to determine an indication of the sensed parameter based on the difference. It will be appreciated that the property of the impedance modulation being applied by the sensor VCO will vary in dependence on both the degree of separation between the reader 20 and the tag 100, and also the measurement of the sensed parameter. Use also of the calibration VCO may enable a controller 30 to calibrate out an influence of the degree of separation between the reader 20 and the tag 100 to identify the contribution to the impedance modulation arising from the sensor measurement.

Such examples described above may enable the provision of a sensor on a tag which may communicate simply with a reader to transmit an indication of a measurement of a sensed parameter. The examples may enable the tag to be provided using simple, small and/or non-expensive componentry, which may enable reliable measurement data to be obtained from the sensor of the tag.

FIG. 4b shows a tag 100 comprising a tag antenna 102, power harvesting circuitry 110, voltage-controlled oscillator circuitry 120 ('VCO circuitry'), and a sensor 130. The VCO circuitry 120 comprises a first voltage-controlled oscillator 121 ('first VCO') and VCO input logic 125.

As with the tag 100 of FIG. 3b, the tag 100 of FIG. 4b is configured to use VCO input logic 125 to provide sequential modulation of the tag antenna 102. As with the tag 100 of FIG. 4a, the tag 100 of FIG. 4b is configured to control operation of the tag 100 to provide sequential modulation of the tag antenna 102 based on a measurement signal and a calibration signal.

Similar to the tag 100 of FIG. 4a, the sensor 130 is configured to provide, as its output, an electrical property which will vary in dependence on the sensed parameter, as measured by the sensor 130. The sensor output is coupled to the first VCO 121, either to vary an input voltage provided to the first VCO 121, or to vary one or more electrical properties of the first VCO 121. In the example shown in FIG. 4b, the VCO input logic 125 is shown as coupled to the input of the first VCO 121 (e.g. to regulate the voltage provided to the first VCO 121). However, it is to be appreciated that the VCO input logic 125 may be coupled between the sensor 130 and the first VCO 121 to regulate the application of the variable measurement-dependent electrical property to the first VCO 121.

The power harvesting circuitry 110 is configured to obtain an operating voltage (as described herein). The tag 100 is operable to apply the operating voltage as an input to the first VCO 121.

In some examples, the tag 100 may be configured to apply the operating voltage as the input to the first VCO 121 for providing both the calibration signal and the sensor signal. In which case, the VCO input logic 125 is configured to control application of an output signal from the sensor 130 to the first VCO 121 so that the tag 100 may sequentially apply the operating voltage to the first VCO 121 with the sensor output influencing the first VCO 121, and with the sensor output not influencing the first VCO 121. As such, the tag 100 may be configured to sequentially provide sensor and calibration impedance modulation of the tag antenna 102. The controller 30 and reader 20 are configured to determine a calibrated indication of the sensed parameter based on a difference between one or more properties associated with the sensor modulation and the calibration modulation.

In some examples, the tag 100 may be configured to apply the operating voltage as the input to the first VCO 121 for providing the calibration signal. The tag 100 may be configured to control the input provided to the first VCO 121 for the sensor signal so that it is based on both the operating voltage and the output from the sensor 130. In which case, the VCO input logic 125 is configured to selectively apply just the operating voltage as the input to the first VCO 121, and to couple the sensor output to the output from the power harvesting circuitry 110 (e.g. the operating voltage) so that the input provided to the first VCO 121 is based on both the operating voltage and the sensor output. As such, the tag 100 may be configured to sequentially provide sensor and calibration impedance modulation of the tag antenna 102. The controller 30 and reader 20 are configured to determine a calibrated indication of the sensed parameter based on a difference between one or more properties associated with the sensor modulation and the calibration modulation.

Alternatives, Variants, Additional Features, and Uses of the Technology

The present disclosure utilises VCO circuitry to provide impedance modulation of a tag antenna. A property of the impedance modulation applied to the tag antenna will be indicative of the sensed parameter. In this sense, the tag is configured to receive the carrier signal from the reader, and to reply by providing a modulation signal. This modulation signal is detected at the reader by identifying changes in the reader antenna impedance brought about by application of the modulation signal to the tag antenna.

It is to be appreciated in the context of the present disclosure that how the tag antenna impedance is modulated to represent the sensed parameter (and also any calibration signals) may be provided in a number of different ways. Each VCO is configured to provide an output signal having an associated frequency which varies in dependence on a magnitude of the voltage provided to that VCO. The modulation signal may be based on the associated frequency. That is, the modulation signal may be applied according to one or more timing parameters, where a value for those timing parameters is set based on the frequency associated with the VCO output. A pattern of impedance modulation may be applied to the tag antenna, and a timing parameter (e.g. a temporal property) of this pattern may vary in dependence on the frequency associated with the VCO output.

The pattern may comprise application of one or more pulses. As a first example, the pattern may comprise an on-off pattern, where a pulse is either applied, or not (e.g. the pattern defines a series of on pulses, where each on pulse is separated from the next on pulse with an off interval). The timing parameter may comprise a pulse duration and/or an interval duration between adjacent pulses may be controlled based on the VCO output. For example, the VCO output may be in the form of a repeating signal at the associated frequency, and the on/off pulses may be controlled so that they are timed according to the repeating signal output from the VCO. The controller may determine the indication of the sensed parameter by identifying changes in the reader antenna impedance associated with a series of on/off pulses being applied to the tag antenna.

A more complex pattern of pulses may be provided than a series of on/off pulses. It will be appreciated that, by controlling additional properties of the modulation pattern, more information may be communicated from the tag to the reader. As one example, the tag may also have a unique identifier associated therewith. For example, the tag may have a data store which stores an indication of this identifier (and/or instructions associated with providing modulation according to that identifier). The tag may be further configured to provide modulation of the tag antenna to communicate information relating to the tag identifier. For example, modulation of the tag antenna may be provided so that both an indication of the sensed parameter, and information relating to the tag identifier are applied together. Alternatively, the tag may provide sequential modulation, so that identifier modulation and sensed parameter modulation are applied separately.

Tag identifier data may provide an indication of the tag, and the controller may access a data store to obtain information associated with that tag. For example, the data store may store an indication of what any sensors of that tag are (e.g. what they are configured to sense). The data store may store an indication of any previous calibration data associated with that tag. The controller may be configured to obtain an indication of the tag identifier by monitoring changes in reader antenna impedance. The controller may be configured to use the tag identifier to obtain additional data associated with that tag, such as modulation data and/or data identifying sensors of that tag. The controller may use the obtained additional data when determining properties of the sensed parameter, as obtained from the tag. For example, the controller may be configured to obtain an indication of a value of the sensed parameter, as well as an indication of what that value represents (e.g. what the parameter being sensed is). For example, the controller may be configured to apply a calibration to the obtained indication of the sensed parameter based on prior calibration data for that tag stored in the data store.

The controller may be configured to identify additional or alternative properties of the modulation signal than on/off pulse timings. It will be appreciated that what these additional properties are may vary in dependence on the pattern being applied. For example, where the modulation signal conforms to a repeating pattern, other properties of the modulation signal may be used. The data rate (e.g. symbol rate) for information being transmitted by the modulation may be used to determine an indication of a value for the sensed parameter. For example, the indication of the sensed parameter may be based on the data rate of a base band signal (e.g. the data rate of the base band signal itself may be used to provide the indication, or other variants of that signal may be used such as fractions of that data rate etc.). A frequency for a repeating pattern may be used.

Modulation of the tag antenna impedance may also be provided which represents more than one indication at any one time. For example, tags of the present disclosure may utilise multiple VCOs to transmit calibration signals and sensed parameter signals. However, these need not be provided as separate signals which are temporally offset from each other. Instead, the tag may be configured to provide a combined signal which includes both a component representing a calibration signal, and a component representing a sensed parameter signal. Impedance of the tag antenna may then be modulated according to the combined signal. Providing the combined signal may comprise offsetting a frequency or timing parameter associated with the sensed parameter component with a frequency or timing parameter associated with the calibration component. For example, the calibration component may have an associated (and known) frequency/timing parameter. A frequency/timing parameter of the combined signal may therefore provide an amount of deviation from this frequency/timing parameter, where that deviation is brought about by the sensed parameter component. The controller may be configured to determine the indication of the sensed parameter by identifying the deviation. For example, the tag may comprise logic for combining the signals, such as by receiving an output (e.g. frequency/ timing parameter) associated with a calibration VCO and an output associated with a sensed parameter VCO, and combining the two outputs.

Voltage-controlled oscillator circuitry of the present disclosure may comprise any suitable voltage-controlled oscillators. Each VCO is configured to provide an output signal having a property (e.g. a frequency) which varies depending on its voltage input. For example, one or more RC oscillators may be used, which provide an output frequency which decreases with increased voltage supplied thereto. For example, one or more ring-type oscillators may be used, which provide an output frequency which increases with increased voltage supplied thereto. It will also be appreciated that the variable electrical properties provided by a sensor of the tag (e.g. to output an indication of a measurand) may be connected with the VCO to adjust the output frequency of that VCO in dependence also on the variable electrical properties from the sensor. For example, the sensor may adjust a resistance or capacitance of the VCO, which in turn may influence that VCO's frequency output. As another example, the sensor may be a passive sensor arranged to draw an amount of current proportional to the measurement (e.g. which selectively provides a flow of current away from the VCO).

Tags of the present disclosure may be provided on a flexible substrate. Components of the tag may function using a plurality of n-type metal oxide thin film transistors ('TFTs'). For example, the VCO circuitry may use such TFTs. Simpler componentry may be used, and fewer requirements may be placed on complexity and size of semiconductor components of the tag.

Controllers of the present disclosure may be configured to perform filtering and/or demodulating of measured signals (e.g. measured changes in reader antenna impedance) when determining information being transmitted from the tag to the reader.

Examples of the present disclosure may provide tags which transmit an indication of a degree of separation between the tag and reader and/or which transmit an indication of a sensed parameter as measured using a sensor of the tag.

Obtaining an indication of the degree of separation is provided by obtaining an indication of the electromagnetic field strength in the vicinity of the tag antenna. It will be appreciated that the degree of separation may provide an indication of a linear separation distance between the tag and reader. The degree of separation may provide an indication of additional or alternative information to linear separation distance. For example, the degree of separation may indicate permittivity for any substances between the tag and reader. For example, the degree of separation may indicate a difference in tilt of tag relative to reader (e.g. how far off parallel the two antennas are). Such reader tag combinations may find use in a number of different situations. For example, they may be used to sense any of: the presence of a passing object (e.g. by a tag passing a reader), a level of fluid inside a container (e.g. by detecting a separation distance between a tag floating on the top of the fluid and a reader at a fixed location in the container, such as a top or bottom of the container), a permittivity meter (e.g. by detecting changes in permittivity of substances between tag and reader), elongation, rotation or movement sensors (e.g. which measure changes in the obtained indication of the degree of separation between reader and tag). Multiple tags and sensors may be provided. For example, object tracking may be provided by placing several tags on the object and monitoring the degree of separation between tags and readers. For example, different tags/readers may be provided with antennas orthogonal to each other to reduce impact of different fields on the tag antennas.

The sensed parameter, as measured by a sensor of the tag, may be any suitable parameter which may be measured using a sensor having an output in the form of an electrical property which varies in dependence on the obtained measurement. For example, sensors may be provided which are configured to sense one or more properties of their environment, such as temperature, pressure, humidity. For example, a thermistor may be provided for heat sensing, or a variable capacitance humidity sensor may be provided. Such tags may of course find use in any suitable sensor system, e.g. to provide sensing of a given parameter using a tag, where information about that sensed parameter may be transmitted to the reader (and thus controller) in a simple, low cost, efficient manner.

It will be appreciated from the discussion above that the examples shown in the figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the embodiments is intended to be separable from the features which it is described in combination with, unless it is expressly stated that some other feature is essential to its operation. Each of these separable features may of course be combined with any of the other features of the embodiment in which it is described, or with any of the other features or combination of features of any of the other embodiments described herein. Furthermore, equivalents and modifications not described above may also be employed without departing from the invention.

It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented using one or more controllers, such as computer programs or hardware, or any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

Other examples and variations of the disclosure will be apparent to the skilled addressee in the context of the present disclosure.

The invention claimed is:

1. A sensor system configured to provide an indication of a sensed parameter, the sensor system comprising:

a reader comprising a reader antenna configured to transmit a carrier signal;

a tag comprising:

a tag antenna configured to receive the carrier signal;

power harvesting circuitry coupled to the tag antenna and configured to produce an operating voltage from the received carrier signal; and voltage-controlled oscillator, VCO, circuitry coupled to the power harvesting circuitry and configured to receive the operating voltage therefrom, wherein the VCO circuitry comprises a VCO configured to generate an output signal having a frequency which varies based on the sensed parameter, and wherein the VCO circuitry is configured to modulate an impedance of the tag antenna according to a timing parameter selected based on the frequency of the output signal from the VCO;

a controller coupled to the reader antenna and configured to: (i) identify an indication of the timing parameter of the impedance modulation of the tag antenna based on detected changes in the reader antenna impedance, and (ii) determine an indication of the sensed parameter based on the identified indication of the timing parameter, wherein the VCO circuitry is configured to control the impedance modulation of the tag antenna to include both: a sensor modulation component, and a calibration modulation component, and wherein controlling the impedance modulation of the tag antenna comprises at least one of:

combining the sensor modulation component and the calibration modulation component to provide a combined modulation component, and controlling the impedance modulation of the tag antenna based on the combined modulation component; or controlling the impedance modulation of the tag antenna based on one of the sensor modulation component and the calibration modulation component and then controlling the impedance modulation of the tag antenna based on the other of the sensor modulation component and the calibration modulation component.

2. The sensor system of claim 1, wherein the VCO circuitry is configured to apply one or more pulses to provide the impedance modulation, and wherein the timing parameter comprises a timing parameter for applying pulses.

3. The sensor system of claim 2, wherein the timing parameter for applying pulses comprises a pulse duration timing and/or a separation time between adjacent pulses.

4. The sensor system of claim 1, wherein the controller is configured to identify the indication of the timing parameter of the impedance modulation of the tag antenna based on the presence of a corresponding timing parameter in the detected changes in the tag antenna impedance.

5. The sensor system of claim 1, wherein the VCO is configured so that the frequency of its output signal varies based at least in part on a magnitude of the operating voltage.

6. The sensor system of claim 1, wherein the controller is configured to:

obtain an indication of at least one of: (i) the combined modulation component, and (ii) both the sensor modulation component and the calibration modulation component, based on detected changes in the tag antenna impedance from the reader antenna; and based on said obtained indication, determine the indication of the sensed parameter.

7. The sensor system of claim 1, wherein the controller is configured to determine a degree of separation between the reader and the tag based on a determined indication of the magnitude of operating voltage.

8. The sensor system of claim 1, wherein the tag further comprises a data store storing identifier data for the tag; and wherein the VCO circuitry is configured to control the impedance modulation of the tag antenna based also on the stored identifier data for the tag.

9. The sensor system of claim 1, wherein the tag is provided at least in part on a flexible substrate.

10. A sensor system configured to provide an indication of a sensed parameter, the sensor system comprising:

a reader comprising a reader antenna configured to transmit a carrier signal;

a tag comprising:

a tag antenna configured to receive the carrier signal;

power harvesting circuitry coupled to the tag antenna and configured to produce an operating voltage from the received carrier signal; and voltage-controlled oscillator, VCO, circuitry coupled to the power harvesting circuitry and configured to receive the operating voltage therefrom, wherein the VCO circuitry comprises a VCO configured to generate an output signal having a frequency which varies based on the sensed parameter, and wherein the VCO circuitry is configured to modulate an impedance of the tag antenna according to a timing parameter selected based on the frequency of the output signal from the VCO;

a controller coupled to the reader antenna and configured to: (i) identify an indication of the timing parameter of the impedance modulation of the tag antenna based on detected changes in the reader antenna impedance, and (ii) determine an indication of the sensed parameter based on the identified indication of the timing parameter, wherein the VCO circuitry is configured to control the impedance modulation of the tag antenna to include both: a sensor modulation component, and a calibration modulation component, and wherein controlling the impedance modulation of the tag antenna to include one of the sensor modulation component or the calibration modulation component comprises modulating the impedance of the tag antenna based on the operating voltage.

11. The sensor system of claim 10, wherein:

controlling the impedance modulation of the tag antenna to include the sensor modulation component comprises modulating the impedance of the tag antenna based on the operating voltage; and controlling the impedance modulation of the tag antenna to include the calibration modulation component comprises modulating the impedance of the tag antenna based on a reference voltage.

12. The sensor system of claim 11, wherein the tag is configured to clamp a voltage from the power conversion circuitry to the VCO circuitry to provide the reference voltage.

13. The sensor system of claim 11, wherein the controller is configured to: (i) determine an indication of a degree of separation based on an obtained indication of both the operating voltage and the reference voltage.

14. A sensor system configured to provide an indication of a sensed parameter, the sensor system comprising:

a reader comprising a reader antenna configured to transmit a carrier signal;

a tag comprising:

a tag antenna configured to receive the carrier signal;

power harvesting circuitry coupled to the tag antenna and configured to produce an operating voltage from the received carrier signal; and voltage-controlled oscillator, VCO, circuitry coupled to the power harvesting circuitry and configured to receive the operating voltage therefrom, wherein the VCO circuitry comprises a VCO configured to generate an output signal having a frequency which varies based on the sensed parameter, and wherein the VCO circuitry is configured to modulate an impedance of the tag antenna according to a timing parameter selected based on the frequency of the output signal from the VCO;

a controller coupled to the reader antenna and configured to: (i) identify an indication of the timing parameter of the impedance modulation of the tag antenna based on detected changes in the reader antenna impedance, and (ii) determine an indication of the sensed parameter based on the identified indication of the timing parameter, wherein the VCO circuitry is configured to control the impedance modulation of the tag antenna to include both: a sensor modulation component, and a calibration modulation component, wherein the tag further comprises a sensor configured to obtain an indication of the sensed parameter, and wherein the VCO circuitry is configured to control the impedance modulation of the tag antenna based on the obtained indication of the sensed parameter from the sensor.

15. The sensor system of claim 14, wherein:

controlling the impedance modulation of the tag antenna to include the sensor modulation component comprises modulating the impedance of the tag antenna based on both the operating voltage and the obtained indication of the sensed parameter from the sensor; and controlling the impedance modulation of the tag antenna to include the calibration modulation component comprises modulating the impedance of the tag antenna based on the operating voltage.

* * * * *